(12) United States Patent
Choo

(10) Patent No.: US 7,579,959 B2
(45) Date of Patent: Aug. 25, 2009

(54) IMAGE RECORDING APPARATUS FOR DISPLAYING STATE OF OPERATION BY LED AND METHOD FOR DISPLAYING THE STATE OF OPERATION THEREOF

(75) Inventor: Dong-chun Choo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 600 days.

(21) Appl. No.: 11/353,044

(22) Filed: Feb. 14, 2006

(65) Prior Publication Data

US 2007/0009226 A1    Jan. 11, 2007

(30) Foreign Application Priority Data

Jul. 11, 2005    (KR)    ...................... 10-2005-0062132

(51) Int. Cl.
*G08B 5/22*    (2006.01)
(52) U.S. Cl. .................................. 340/815.45; 345/690
(58) Field of Classification Search ............ 340/815.45, 340/815.4, 691.1, 691.6; 345/204, 690
See application file for complete search history.

(56) References Cited

U.S. PATENT DOCUMENTS

| | | | | |
|---|---|---|---|---|
| 4,232,312 A | * | 11/1980 | Eccles et al. ................. | 345/690 |
| 5,996,079 A | * | 11/1999 | Klein ......................... | 713/300 |
| 6,133,844 A | * | 10/2000 | Ahne et al. ............ | 340/815.45 |
| 7,236,099 B2 | * | 6/2007 | Schult .................... | 340/815.45 |
| 2001/0045944 A1 | * | 11/2001 | Iwasaki ...................... | 345/204 |
| 2006/0185499 A1 | * | 8/2006 | D'Addario et al. ............ | 84/454 |

FOREIGN PATENT DOCUMENTS

| | | |
|---|---|---|
| JP | 4-115392 | 10/1992 |
| JP | 08-272332 | 10/1996 |
| JP | 2004-207411 | 7/2004 |
| KR | 1992-0001210 | 2/1992 |
| KR | 1998-0004891 | 3/1998 |
| KR | 1001170661 | 10/1998 |

* cited by examiner

*Primary Examiner*—Thomas J Mullen
(74) *Attorney, Agent, or Firm*—Roylance, Abrams, Berdo & Goodman, L.L.P.

(57) ABSTRACT

Provided is an image recording apparatus having a plurality of functions, including a plurality of light emitting diodes (LEDs) for displaying an operational state of each of the plurality of functions; an LED controller for outputting to the plurality of LEDs a duty cycle for adjusting a brightness of the LEDs corresponding to the operational state of each of the plurality of functions; and a CPU for outputting to the LED controller a register value which changes the duty cycle corresponding to the operational state of each of the plurality of functions. Therefore, the image recording apparatus displays an operation state using its own LED so that the visual effect can be obtained to display the state of an operation of a presently performed function.

20 Claims, 11 Drawing Sheets

IMAGE RECORDING APPARATUS FOR DISPLAYING STATE OF OPERATION BY LED AND METHOD FOR DISPLAYING THE STATE OF OPERATION THEREOF

CROSS-REFERENCE TO RELATED PATENT APPLICATION

This application claims the benefit under 35 U.S.C. §119 (a) of Korean Patent Application No. 2005-62132, filed on Jul. 11, 2005, in the Korean Intellectual Property Office, the entire disclosure of which is hereby incorporated by reference.

BACKGROUND OF THE INVENTION

1. Field of the Invention

The present invention relates to an image recording apparatus and a method for displaying an operational state thereof. More particularly, the present invention relates to an image forming apparatus having a Light Emitting Diode (LED) display used for displaying a presently performed function and an operational state of the function, and a method for displaying the state of the operation.

2. Description of the Related Art

An image recording apparatus records image data, corresponding to received external image signals, on a recording medium, and reproduces image data corresponding to the recorded image data. Exemplary image recording apparatuses include Personal Video Recorders (PVR), Video Cassette Recorders (VCR), Digital Versatile Disk (DVD) recorders, Compact Disk (CD) recorders, Hard Disk Driver (HDD) rerecorders, camcorders, Personal Digital Assistants (PDA), set top boxes, and VCR-DVD combination apparatuses. A recently introduced image recording apparatuses is a recording apparatus in which a hard disk drive is mounted to a set top box.

Generally, image recording apparatuses perform the functions of fast forward, rewind, pause, and power up/down, in addition to recording and reproducing. Since various functions are performed, a method is required to inform the user of the current function being performed and the operational state of the function.

A conventional image recording apparatus employs an external display device, such as TV, to display the presently performed function and the operational state of the function. Usually, an indication of the presently performed function and the operational state of the function is displayed on a portion of a TV screen.

Thus, with the conventional image recording apparatus, a user is inconvenienced if the external display device is not equipped because there would be no way to display the presently performed function and the operational state of the function.

Accordingly, there is a need for an improved image recording apparatus that can display the presently performed function and the operational state of the function without requiring an external display device so as to increase convenience to a user.

SUMMARY OF THE INVENTION

Exemplary embodiments of the present invention address at least the above problems and/or disadvantages and provide at least the advantages described below. Accordingly, an aspect of the present invention is to provide an image recording apparatus that displays the operational state of presently performed functions by using its own LED, and a method for displaying the operational state.

According to an aspect of an exemplary embodiment of the present invention, an image recording apparatus having a plurality of functions includes a plurality of light emitting diodes (LEDs) for displaying an operational state of each of the plurality of functions. Further included is an LED controller for outputting to the plurality of LEDs a duty cycle for adjusting a brightness of the LEDs corresponding to the operational state of each of the plurality of functions. Additionally included is a CPU for outputting to the LED controller a register value which changes the duty cycle corresponding to the operational state of each of the plurality of functions.

The plurality of LEDs may be arranged in the form of ring.

The plurality of functions may be at least one of play, record, fast forward, rewind, pause, power up, and power down.

According to an aspect of an exemplary embodiment of the present invention, a method for displaying a state of operation of an image recording apparatus having a plurality of functions includes outputting a register value used for changing a duty cycle that adjusts an LED, corresponding to an operational state of each of the plurality of functions. The method further includes outputting to a plurality of LEDs the duty cycle corresponding to the operational state for each of the plurality of functions. Moreover, the method includes displaying the operational state of each of the plurality of functions according to the duty cycle.

Other objects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features, and advantages of certain embodiments of the present invention will be more apparent from the following description taken in conjunction with the accompanying drawings, in which.

Figure 9A:
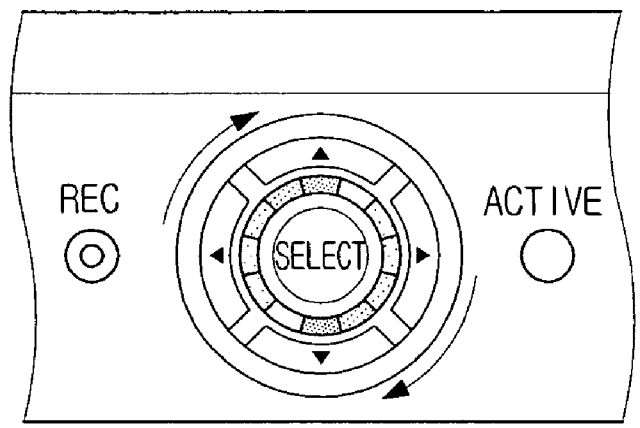
Figure 9B:
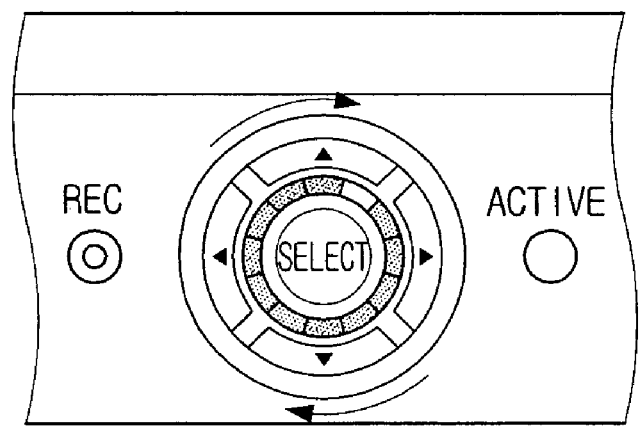
Figure 10A:
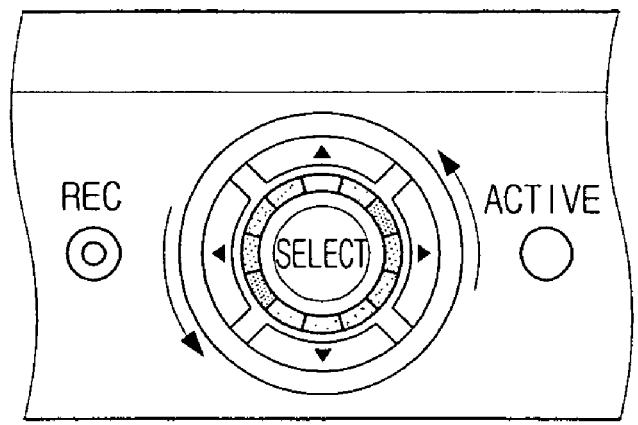
Figure 10B:
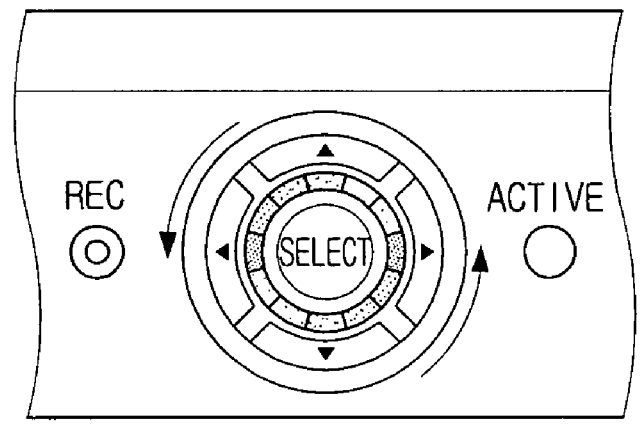
Figure 11:
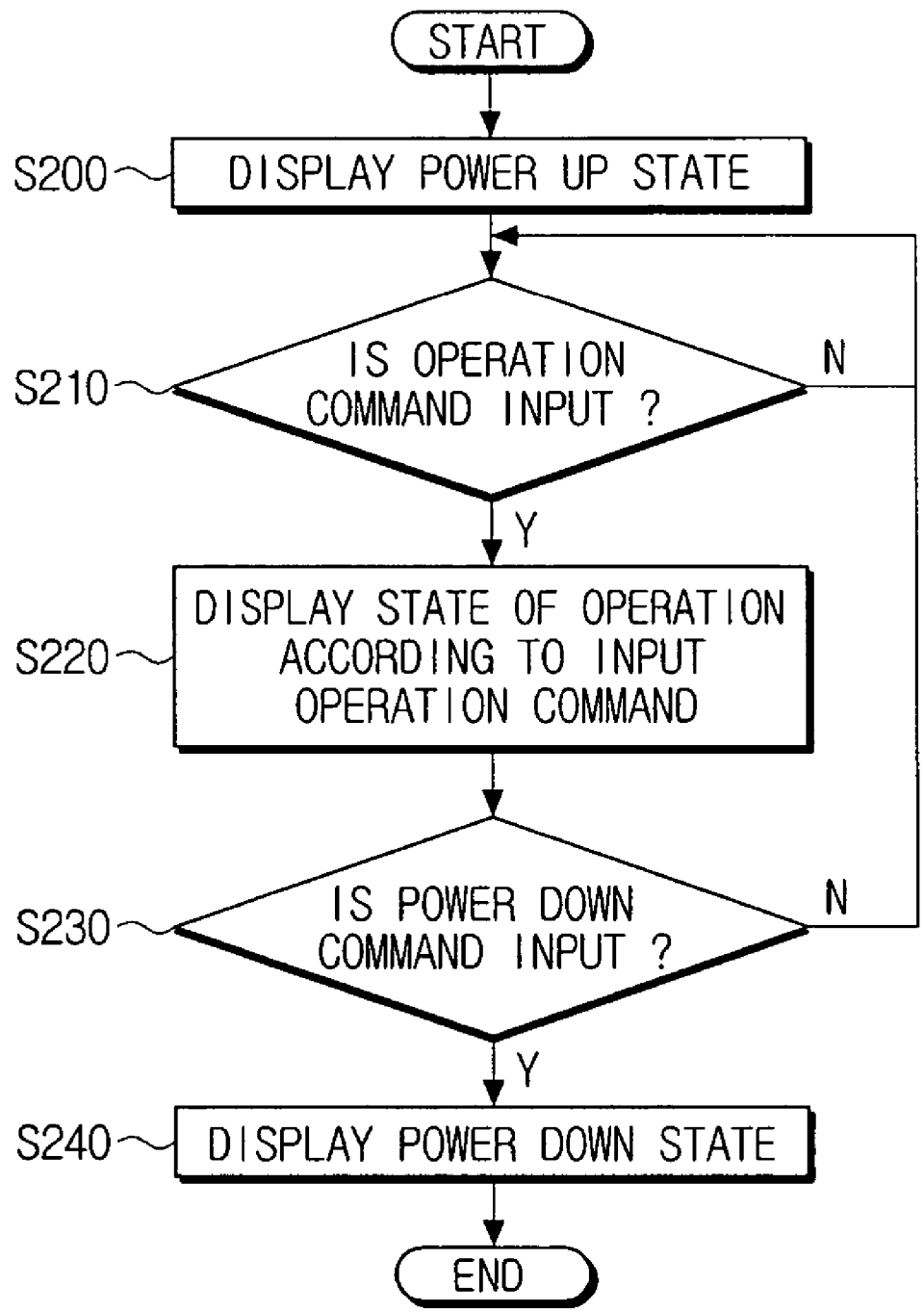

7A through 7C are views of a rewind state of an image recording apparatus according to an exemplary embodiment of the present invention;

FIGS. 8A through 8E are views of a pause state of an image recording apparatus according to an exemplary embodiment of the present invention;

FIGS. 9A and 9B are views of a power up state of an image recording apparatus according to an exemplary embodiment of the present invention;

FIGS. 10A and 10B are views of a power down state of an image recording apparatus according to an exemplary embodiment of the present invention; and FIG. 11 is a flowchart of a method for displaying a state of operation of an image recording apparatus according to an exemplary embodiment of the present invention.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
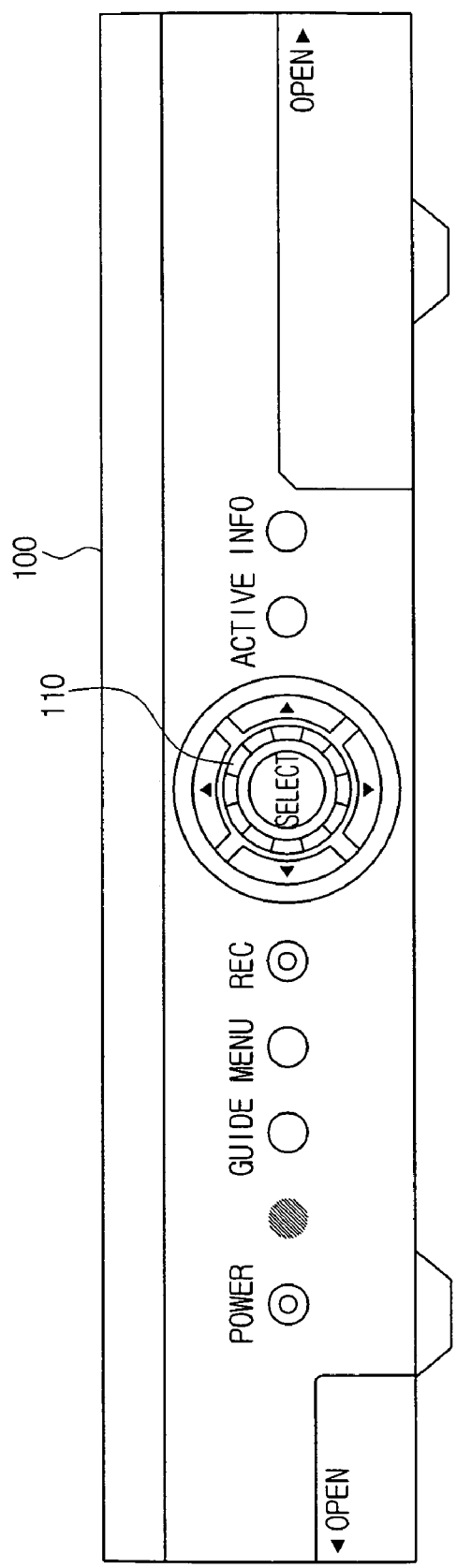
FIG. 1 is a view of an image recording apparatus according to an exemplary embodiment of the present invention.

FIG. 1 is a view of an image recording apparatus according to an exemplary embodiment of the present invention.

An image recording apparatus 100 according to an exemplary embodiment of the present invention comprises an Light Emitting Diode (LED) display 110, arranged in the form of ring, that displays functions such as play, record, fast forward (FF), rewind, pause, and power up/down. The image recording apparatus 100 adjusts brightness and an on/off state of the LED display 110 so as to display the operational state of performed functions.

Referring to FIG. 1, the image recording apparatus 100 comprises on a front end, a power button for powering on/off, a guide button for displaying a guide, a menu button for displaying menu that includes functions, a record (REC) button, an up, down, left and right directional button, a select button for making a selection, and other buttons. Of course the image recording apparatus 100 may omit any of the above buttons and/or may include additional buttons.

The image recording apparatus 100 comprises an LED display 110 arranged in the form of ring between the up, down, left, right moving buttons and the select button. Of course, the placement of the LED display 110 on the image recording apparatus 100 is merely exemplary as the LED display may be placed at other locations on the image recording apparatus 100 or may be displayed remote from the image recording apparatus 100.

Figure 2:
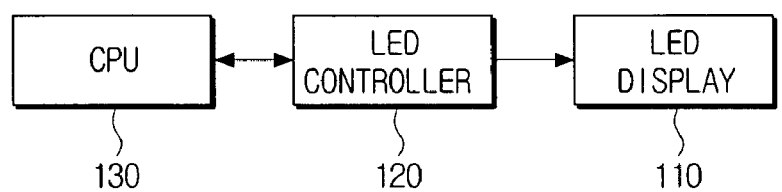
FIG. 2 is a schematic block diagram of an image recording apparatus according to an exemplary embodiment of the present invention.

FIG. 2 is a schematic block diagram of an image recording apparatus according to an exemplary embodiment of the present invention.

Referring to FIG. 2, the image recording apparatus 100 comprises the LED display 110, an LED controller 120, and a Control Processor Unit (CPU) 130.

The LED display 110 is preferably provided with a plurality of similarly colored LEDs, such as the color blue. Of course, the plurality of similarly colored LEDs may be selected to be a color other than blue. Further, the plurality of LEDs may be made up of LEDs of different colors or groups of LEDS comprising different colors with each group comprising LEDs of the same colors.

The LED controller 120 adjusts the brightness and on/off of the LED display 110 to display the state of operation for each function. In other words, the LED controller 120 has ports corresponding to the number of the LEDs in the LED display 110, and each port is connected to a single LED. The LED controller 120 changes the duty cycle of a pulse width modulation (PWM) to adjust the brightness and on/off of each LED in the LED display 110.

The duty cycle is a ratio between the pulse width and the pulse period, and is represented as a percentage. As the duty cycle is increased, the pulse width becomes wider while the period remains the same and an LED gets brighter. The CPU 130 outputs register values corresponding to each function to the LED controller 120 by using I2C communication. According to the register values output by the CPU 130, the LED controller 120 changes the duty cycle to adjust the brightness and on/off of each LED in the LED display 110.

If the register value is low, electricity is controlled to flow through an LED of the LED display 110 so as to turn on the LED 110, and if the register value is high, electricity is controlled to not flow through the LED 110 thereby turning off the LED 110. The brightness of the LED 110 is adjusted according to the repetition of low and high register values. As the frequency of the repetition of low and high values is increased, the duty cycle is increased so that the LED 110 gets brighter. As the frequency of the repetition of low and high value is decreased, the duty cycle is decreased so that the LED 110 gets darker.

The LED controller 120 and the CPU 130 are separately depicted and explained, however, the CPU 130 may perform additional functions including the functions of the LED controller 120.

Figure 3:
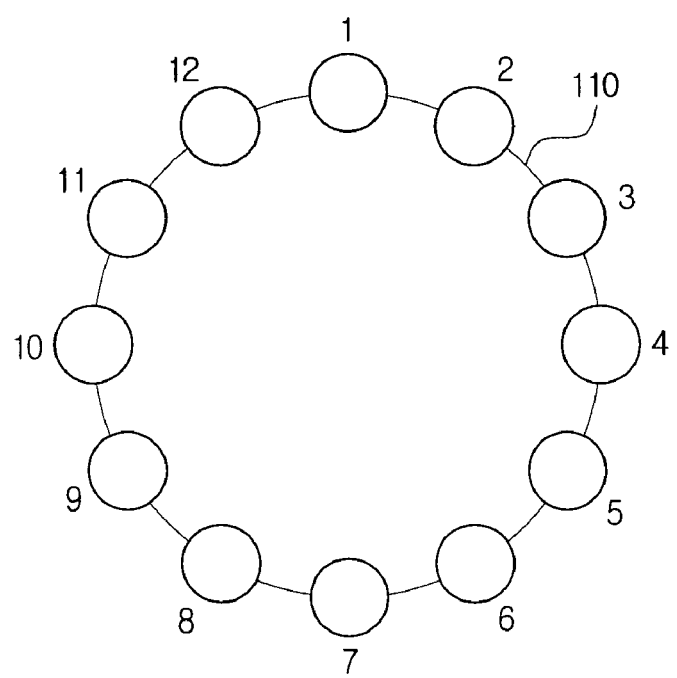
FIG. 3 is a view of a plurality of LEDs of an image recording apparatus according to an exemplary embodiment of the present invention.

FIG. 3 is a view of an LED display 110 for an image forming apparatus according to an exemplary embodiment of the present invention.

Referring to FIG. 3, the LED display 110 is arranged in the form of ring and consists of twelve blue LEDs. According to each function such as play, record, fast forward, rewind, pause, and power up/down, the combination of the brightness and on/off state of each LED is different. Of course, a different number of LEDs, other than twelve can, can be used. Furthermore, the LED display 110 may take a shape other than a ring.

Figure 4A:
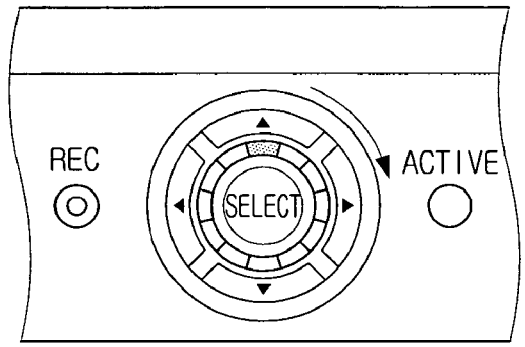
FIG. 4A through 4C are views of a play state of an image recording apparatus according to an exemplary embodiment of the present invention.
Figure 4B:
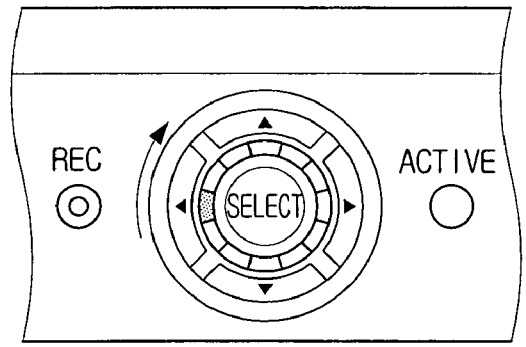
Figure 4C:
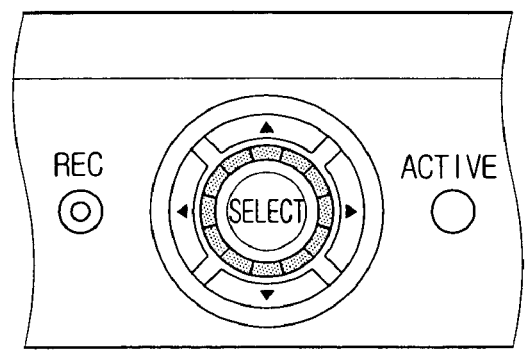

FIGS. 4A through 4C are views of a play state of an image recording apparatus according to an exemplary embodiment of the present invention.

Referring to FIGS. 4A through 4C, the operation of the LED 110 can be seen as the image recording apparatus 100 performs the play function. If a play command is input, the CPU 130 outputs a register value corresponding to the play function to the LED controller 120. As shown in FIG. 4A, the LED controller 120 outputs a duty cycle of 70% to one LED connected to one port according to the register value. This results in the one LED having a brightness level of 70%.

After a period of time the one LED having the brightness of 70% is controlled to turn off as an adjacent LED is controlled to turn on at a brightness of 70%. The adjacent LED is the adjacent LED in a clockwise direction. The above step is repeated until the all of the LEDs in the ring have been sequentially displayed at a brightness of 70%. FIG. 4B. shows an LED having the brightness of 70%. After rounding the ring, all of the twelve LEDs are simultaneously turned on at a 70% brightness, as shown in FIG. 4C. Then, the operations of FIGS. 4A through 4C are continually repeated to display the state of play operation.

Figure 5:
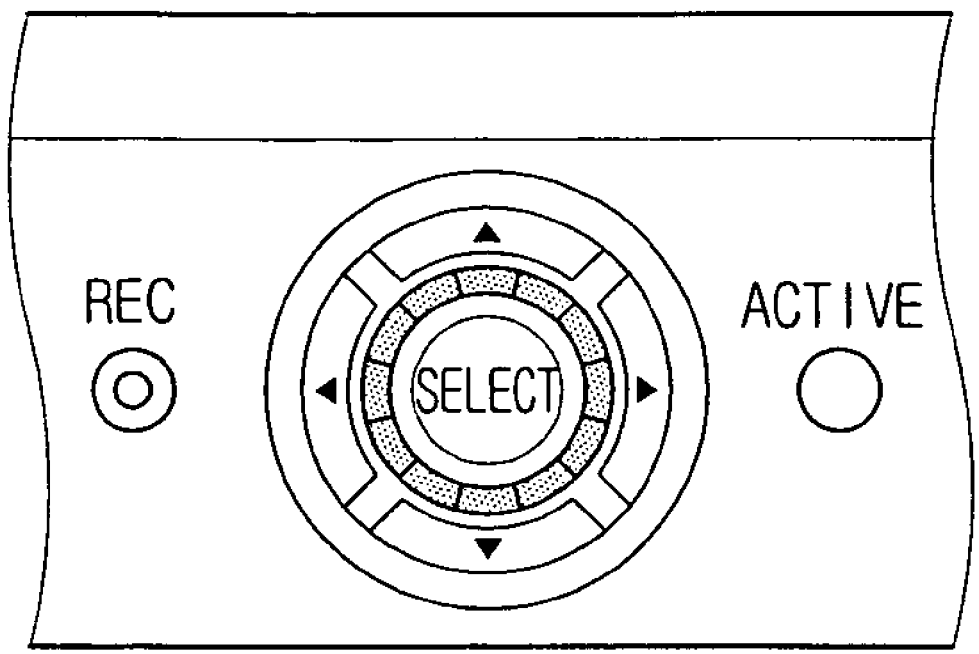
FIG. 5 is a view of a record state of an image recording apparatus according to an exemplary embodiment of the present invention.

FIG. 5 is a view of a record state of an image recording apparatus according to an exemplary embodiment of the present invention.

Referring to FIG. 5, the operation of the LED display 110 can be seen as the image recording apparatus 100 performs a record function. If a record command is input, the CPU 130 outputs the register value, corresponding to the record function, to the LED controller 120. The LED controller 120 simultaneously outputs a duty cycle of 70% to each LED connected to the twelve ports, according to the register value.

The twelve LEDs 110 have 70% brightness as controlled by the LED controller 120, and maintain 70% brightness during the record operation to display the record operation state.

Figure 6A:
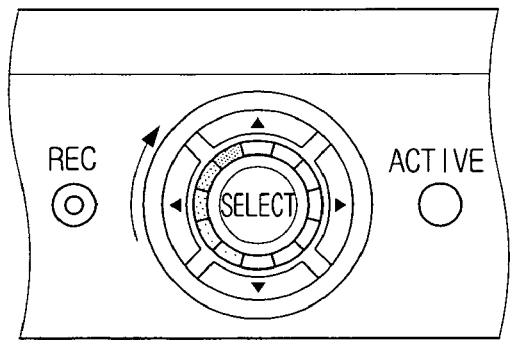
FIG. 6A through 6C are views of a fast forward state of an image recording apparatus according to an exemplary embodiment of the present invention.
Figure 6B:
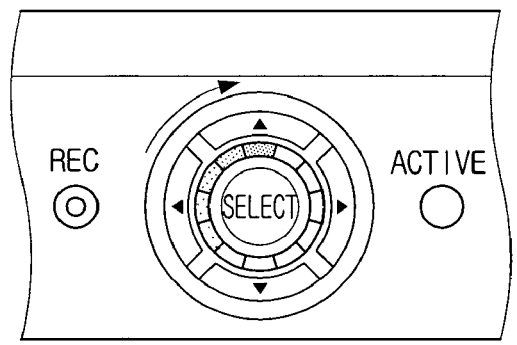
Figure 6C:
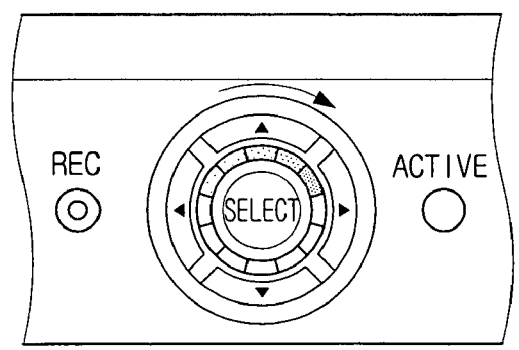

FIGS. 6A through 6C are views of a fast forward (FF) state of an image recording apparatus according to an exemplary embodiment of the present invention.

Referring to FIGS. 6A through 6C, the operation of the LED 110 can be seen as the image recording apparatus 100 performs a FF function. If a FF command is input, the CPU 130 outputs a register value corresponding to the FF function to the LED controller 120. The LED controller 120 outputs the duty cycles of 70%, 50%, 30%, 20% and 10% to a group of five adjacent LEDs connected to five ports among the twelve ports, according to the register value. The duty cycles of 70%, 50%, 30%, 20% and 10% are assigned to the group of five adjacent LEDs with the brightness increasing in a clockwise direction.

The group of five adjacent LEDs at 70%, 50%, 30%, 20% and 10% brightness changes after a period of time such that group of five adjacent LEDs shifts one LED in a clockwise direction. The above step is repeated while the FF function is in operation.

Table 1 shows the brightness of the LED 110 according to the speed of the FF function.

TABLE 1

|       | FF1(*2) | FF2(*4) | FF3(*16) | FF4(*32) |
|-------|---------|---------|----------|----------|
| LED 1 | 70%     | 80%     | 90%      | 100%     |
| LED 2 | 50%     | 60%     | 70%      | 80%      |
| LED 3 | 30%     | 40%     | 60%      | 60%      |
| LED 4 | 20%     | 30%     | 40%      | 50%      |
| LED 5 | 10%     | 20%     | 30%      | 40%      |
| LED 6 |         | 10%     | 20%      | 30%      |
| LED 7 |         |         | 10%      | 20%      |
| LED 8 |         |         |          | 10%      |

As can be seen from the table 1, the brightness of the LEDs increase and the number of turned-on LEDs increases as the speed of the FF increases in the order of FF1(*2), FF2(*4), FF3(*16), and FF4(*32). Further, as the speed of FF increases, the rate of the clockwise shifting of illuminated LEDs increases in accordance with the speed of FF.

7A through 7C are views of a rewind state of an image recording apparatus according to an exemplary embodiment of the present invention.

Figure 7A:
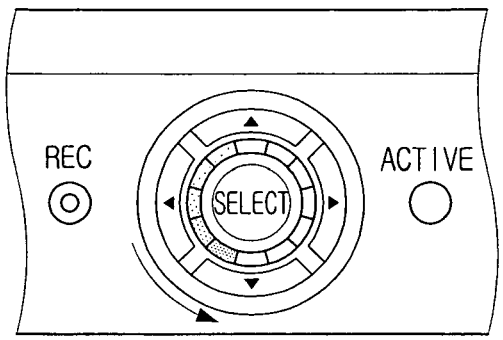
Figure 7B:
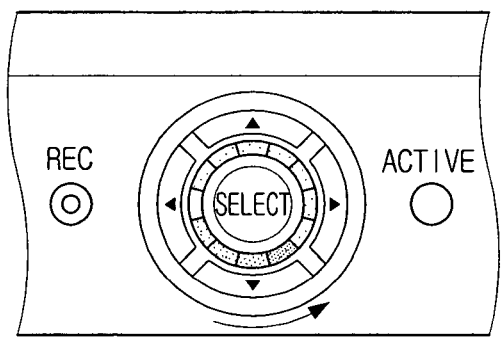
Figure 7C:
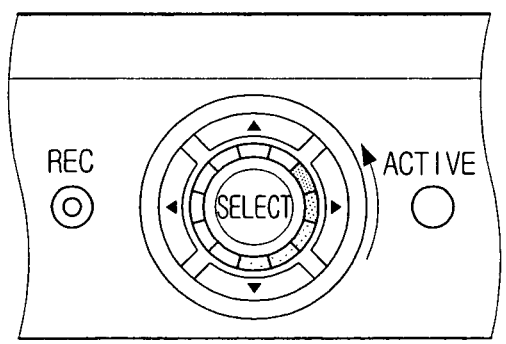

Referring to FIGS. 7A through 7C, the operation of the LED display 110 can be seen as the image recording apparatus 100 performs a rewind function. If a rewind command is input, the CPU 130 outputs a register value, corresponding to the rewind function, to the LED controller 120. The LED controller 120 outputs a duty cycle of 70%, 50%, 30%, 20% and 10% to a group of five adjacent LEDs connected to the five ports among the twelve ports, according to the register value. The duty cycles of 70%, 50%, 30%, 20% and 10% are assigned to the group of five adjacent LEDs with the brightness increasing in a counterclockwise direction.

The group of five adjacent LEDs at 70%, 50%, 30%, 20% and 10% brightness changes after a period of time such that group of five adjacent LEDs shifts one LED in a counterclockwise direction. The above step is repeated while the rewind function is in operation.

Table 2 shows the brightness of the LED 110 according to the speed of the rewind function.

TABLE 2

|       | RWD1(*2) | RWD2(*4) | RWD3(*16) | RWD4(*32) |
|-------|----------|----------|-----------|-----------|
| LED 1 | 70%      | 80%      | 90%       | 100%      |
| LED 2 | 50%      | 60%      | 70%       | 80%       |
| LED 3 | 30%      | 40%      | 60%       | 60%       |
| LED 4 | 20%      | 30%      | 40%       | 50%       |
| LED 5 | 10%      | 20%      | 30%       | 40%       |
| LED 6 |          | 10%      | 20%       | 30%       |
| LED 7 |          |          | 10%       | 20%       |
| LED 8 |          |          |           | 10%       |

As can be seen from the table 2, the brightness of the LEDs increase and the number of turned-on LEDs increase as the speed of rewind increases in the order of RWD1(*2), RWD2(*4), RWD3(*16), and RWD4(*32). Further, as the speed of rewind increases, the rate of the counterclockwise shifting of illuminated LEDs increases with the speed of rewind.

8A through 8C are views of pause state of an image recording apparatus according to an exemplary embodiment of the present invention.

Figure 8A:
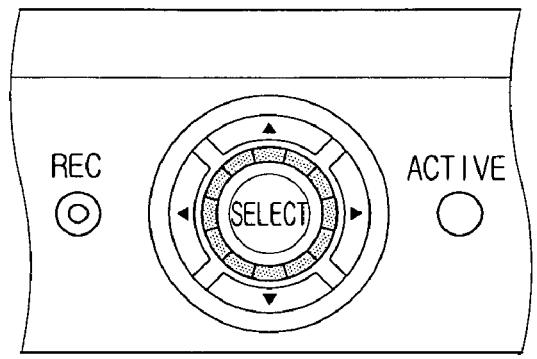
Figure 8B:
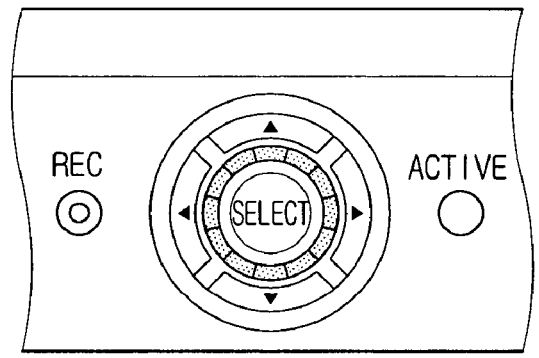
Figure 8C:
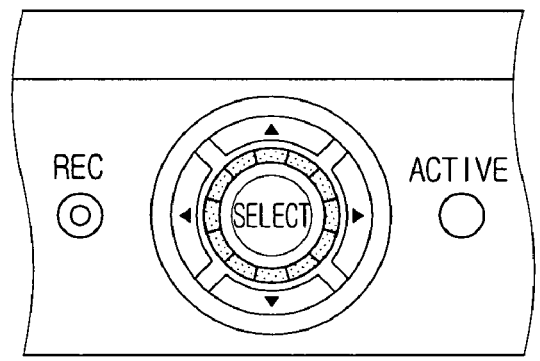
Figure 8D:
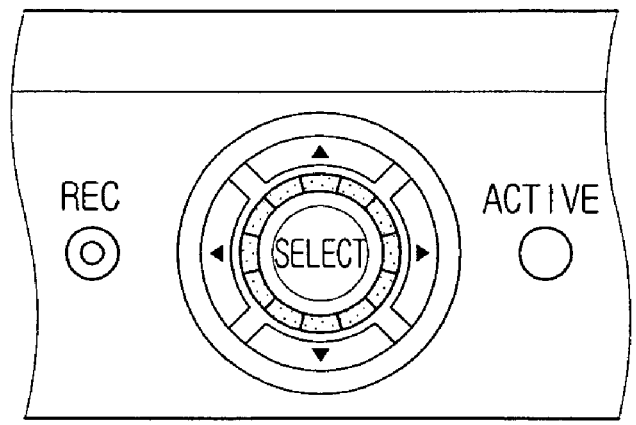
Figure 8E:
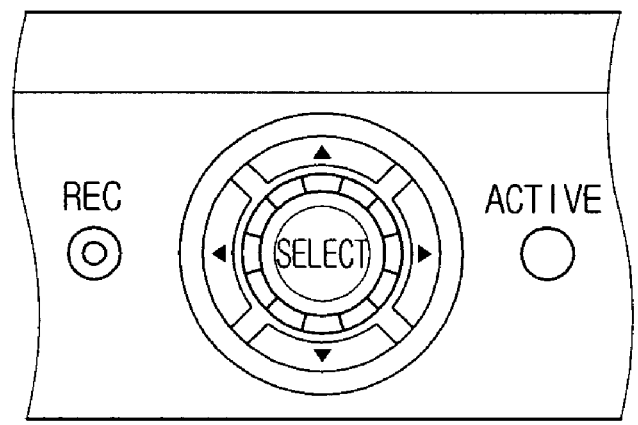

Referring to FIGS. 8A through 8C, the operation of the LED 110 can be seen as the image recording apparatus 100 performs a pause function. If a pause command is input, the CPU 130 outputs a register value corresponding to the pause function to the LED controller 120. The LED controller 120 sequentially outputs a duty cycle of 90%, 70%, 50%, 30%, 20% and 10% to all of LEDs connected to the twelve ports, according to the register value. Then, the LED controller 120 sequentially outputs the duty cycle of 20%, 30%, 50% and 70% to the twelve ports.

In operation, the twelve LEDs of the LED display 110 turn on with 90% brightness by the LED controller 120, and then gradually get darker with 70%, 50%, 30% and then 10% brightness. Then, the brightness of the twelve LEDs increases in order shown in FIGS. 8E to 8A. All of the LEDs repeats the cycle of the increase and reduction of the brightness to display the state of pause function.

FIGS. 9A and 9B are views of power up state of an image recording apparatus according to an exemplary embodiment of the present invention.

Referring to FIGS. 9A and 9B, the operation of the LED 110 can be seen as the image recording apparatus 100 is powered up. If a power up command is input, the CPU 130 outputs a register value corresponding to the power up function to the LED controller 120. The LED controller 120 outputs the duty cycle of 100%, 80%, 60%, 40%, 20%, and 10% respectively to a group of six LEDs connected to six ports among the twelve ports according to the register value, and outputs the duty cycle of each 100%, 80%, 60%, 40%, 20%, and 10% respectively to the LEDs connected to the other six ports.

The six LEDs and the other six LEDs among the twelve LEDs round clockwise with 100%, 80%, 60%, 40%, 20%, and 10% brightness, respectively, till the power up operation is completed.

FIGS. 10A and 10B are views of power down state of an image recording apparatus according to an exemplary embodiment of the present invention.

Referring to FIGS. 10A and 10B, the operation of the LED display 110 can be seen as the image recording apparatus 100 is powered down. If a power down command is input, the CPU 130 outputs a register value corresponding to the power down function to the LED controller 120. The LED controller 120 outputs the duty cycle of 100%, 80%, 60%, 40%, 20% and 10% respectively to a group of six LEDs connected to six ports among the twelve ports according to the register value, and outputs the duty cycle of each 100%, 80%, 60%, 40%, 20% and 10% respectively to the LEDs connected to the other six ports.

The six LEDs and the other six LEDs among the twelve LEDs round counterclockwise with 100%, 80%, 60%, 40%, 20%, and 10% brightness, respectively, till the power down is completed.

FIG. 11 is a flowchart of a method for displaying the state of operation of an image recording apparatus according to an exemplary embodiment of the present invention.

Referring to FIG. 11, if a powered up command is received, the LED 110 displays the power up state using the CPU 130 and the LED controller 120 (S200). Displaying the state of power up operation has been already explained with reference to FIGS. 9A and 9B, and therefore, the description thereof will be omitted for the sake of brevity.

As the power up is completed, the CPU 130 determines if commands regarding other functions are input (S210). Exemplary functions include play, record, fast forward, rewind, pause and power up/down. Additionally, a stop function can be performed and the operation state thereof can be displayed.

If it is determined that an operation commands is input, the LED display 110 displays the state of operations according to operation command input by the CPU 130 and the LED controller 120 (S220). The displaying on the LED display 110 according to each operation has been already explained with reference to FIGS. 4A through 8E, and therefore, the description thereof will be omitted for the sake of brevity.

The CPU 130 determines if a power down command is input (S230). If it is determined that the power down command is input, the LED 110 displays the power down state by the CPU 130 and the LED controller 120 (S240). Displaying the state of the power down operation has been already explained with reference to FIGS. 10A and 10B, and therefore, the description thereof will be omitted for the sake of brevity.

In the above description an image recording apparatus has been described. However, the exemplary embodiments of the invention are equally applicable to an image reproducing apparatus.

As described above, according to exemplary embodiments of the present invention, the image recording apparatus displays an operation state using its own LED so that the visual effect can be obtained to display the state of an operation of a presently performed function.

While the invention has been shown and described with reference to certain embodiments thereof, it will be understood by those skilled in the art that various changes in form and details may be made therein without departing from the spirit and scope of the invention as defined by the appended claims.

What is claimed is:

1. An image recording apparatus for performing a plurality of functions, comprising:
    a plurality of light emitting diodes (LEDs) for displaying an operational state of each of the plurality of functions;
    an LED controller for outputting to the plurality of LEDs a duty cycle for adjusting a brightness of the LEDs corresponding to the operational state of each of the plurality of functions; and
    a CPU for outputting to the LED controller a register value which changes the duty cycle corresponding to the operational state of each of the plurality of functions.

2. The apparatus as claimed in claim 1, wherein the plurality of LEDs are arranged in the form of a ring.

3. The apparatus as claimed in claim 2, wherein to display the operational state of a fast forward function, the LED controller illuminates a number of LEDs among the plurality of LEDs with a gradual increase in brightness levels in a clockwise direction, and wherein the number of illuminated LEDs, the brightness levels of illuminated LEDs, and a rounding speed of the illuminated LEDs differ according to a speed of the fast forward.

4. The apparatus as claimed in claim 2, wherein to display the operational state of a rewind function, the LED controller illuminates a number of LEDs among the plurality of LEDs with a gradual increase in brightness levels in a counterclockwise direction, and wherein the number of illuminated LEDs, the brightness levels of illuminated LEDs, and a rounding speed of the illuminated LEDs differ according to a speed of the rewind.

5. The apparatus as claimed in claim 2, wherein to display the operational state of a power up function the LED controller illuminates a first group of LEDs among the plurality of LEDs in a clockwise direction with gradually increased brightness levels, and illuminates a second group of LEDs among the plurality of LEDs in a clockwise direction with gradually increased brightness levels, wherein the first group of LEDs and the second group of LEDs are two mutually exclusive groups of LEDs among the plurality of LEDs.

6. The apparatus as claimed in claim 2, wherein to display the operational state of a power down function the LED controller illuminates a first group of LEDs among the plurality of LEDs in a counterclockwise direction with gradually increased brightness levels, and illuminates a second group of LEDs among the plurality of LEDs in a counterclockwise direction with gradually increased brightness levels, wherein the first group of LEDs and the second group of LEDs are two mutually exclusive groups of LEDs among the plurality of LEDs.

7. The apparatus as claimed in claim 1, wherein the plurality of functions comprise at least one of play, record, fast forward, rewind, pause, power up, and power down.

8. The apparatus as claimed in claim 1, wherein to display the operational state of a play function the LED controller sequentially, in a clockwise direction, illuminates one of the plurality of LEDs with a certain brightness, and then all of the plurality of LEDs illuminate with the certain brightness.

9. The apparatus as claimed in claim 1, wherein to display the operational state of a record function, the LED controller illuminates all of the plurality of LEDs with a certain brightness.

10. The apparatus as claimed in claim 1, wherein to display the operational state of a pause function the LED controller illuminates all of the plurality of LEDs by repeating a gradual reduction and increase of the brightness of all of the plurality of LEDs.

11. A method for displaying a state of operation of an image recording apparatus that performs a plurality of functions, comprising:
    outputting a register value used for changing a duty cycle that adjusts an LED, corresponding to an operational state of each of the plurality of functions;
    outputting to a plurality of LEDs the duty cycle corresponding to the operational state for each of the plurality of functions; and
    displaying the operational state of each of the plurality of functions according to the duty cycle.

12. The method as claimed in claim 11, wherein the plurality of LEDs are arranged in the form of a ring.

13. The method as claimed in claim 12, wherein the plurality of functions comprise at least one of play, record, fast forward, rewind, pause, power up, and power down.

14. The method as claimed in claim 12, wherein the displaying the operational state of each of the plurality of functions comprises displaying the operational state of a play function by sequentially, in a clockwise direction, illuminating one of the plurality of LEDs, and then turning on all of the plurality of LEDs with a certain brightness.

15. The method as claimed in claim 12, wherein the displaying the operational state of each of the plurality of functions comprises displaying the operational state of a record function by turning on all of the plurality of LEDs with a certain brightness.

16. The method as claimed in claim 12, wherein the displaying the operational state of each of the plurality of functions comprises displaying the operational state of a fast forward function by illuminating a number of LEDs among the plurality of LEDs with a gradual increase in brightness levels in a clockwise direction, and wherein the number of illuminated LEDs, the brightness levels of illuminated LEDs, and a rounding speed of illuminated LEDs are differ according to a speed of the fast forward.

17. The method as claimed in claim 12, wherein the displaying the operational state of each of the plurality of functions comprises displaying the operational state of a rewind function by illuminating a number of LEDs among the plurality of LEDs with gradual increase in brightness levels in a counterclockwise direction, and wherein the number of illuminated LEDs, the brightness levels of illuminated LEDs, and a rounding speed of illuminated LEDs differ according to a speed of the rewind.

18. The method as claimed in claim 12, wherein the displaying the operational state of each of the plurality of functions comprises displaying the operational state of a pause function by repeating a gradual reduction and increase of the brightness of all of the plurality of LEDs.

19. The method as claimed in claim 12, wherein the displaying the operational state of each of the plurality of functions comprises displaying the operational state of a power up function by illuminating a first group of LEDs among the plurality of LEDs in a clockwise direction with gradually increased brightness levels and illuminating a second group of LEDs among the plurality of LEDs in a clockwise direction with gradually increased brightness levels, wherein the first group of LEDs and the second group of LEDs are two mutually exclusive groups of LEDs among the plurality of LEDs.

20. The apparatus as claimed in claim 12, wherein the displaying the operational state of each of the plurality of functions comprises displaying the operational state of a power down function by illuminating a first group of LEDs among the plurality of LEDs in a counterclockwise direction with gradually increased brightness levels and illuminating a second group of LEDs among the plurality of LEDs in a counterclockwise direction with gradually increased brightness levels, wherein the first group of LEDs and the second group of LEDs are two mutually exclusive groups of LEDs among the plurality of LEDs.

\* \* \* \* \*

UNITED STATES PATENT AND TRADEMARK OFFICE
CERTIFICATE OF CORRECTION

PATENT NO.        : 7,579,959 B2                                    Page 1 of 1
APPLICATION NO.   : 11/353044
DATED             : August 25, 2009
INVENTOR(S)       : Dong-chun Choo It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 792 days.

Signed and Sealed this

Fourteenth Day of September, 2010

David J. Kappos
*Director of the United States Patent and Trademark Office*